(12) United States Patent
Danielson

(10) Patent No.: US 7,152,797 B1
(45) Date of Patent: Dec. 26, 2006

(54) APPARATUS AND METHOD FOR READING EMBEDDED INDICIA

(75) Inventor: Arvin D. Danielson, Solon, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 10/948,101

(22) Filed: Sep. 23, 2004

Related U.S. Application Data

(60) Provisional application No. 60/505,358, filed on Sep. 23, 2003.

(51) Int. Cl.
G06K 7/10 (2006.01)

(52) U.S. Cl. .................................. 235/462.06
(58) Field of Classification Search ............ 235/462.06
See application file for complete search history.

(56) References Cited

U.S. PATENT DOCUMENTS

| | | | | |
|---|---|---|---|---|
| 5,756,981 | A * | 5/1998 | Roustaei et al. | 235/462.42 |
| 6,598,797 | B1 * | 7/2003 | Lee | 235/462.22 |
| 6,772,948 | B1 * | 8/2004 | Kim | 235/462.25 |
| 6,830,184 | B1 * | 12/2004 | Tsikos et al. | 235/462.01 |
| 6,902,111 | B1 * | 6/2005 | Han et al. | 235/454 |
| 6,913,202 | B1 * | 7/2005 | Tsikos et al. | 235/472.01 |

FOREIGN PATENT DOCUMENTS

JP    01277980 A  * 11/1989

* cited by examiner

*Primary Examiner*—Steven S. Paik
*Assistant Examiner*—Tae W. Kim
(74) *Attorney, Agent, or Firm*—Shook, Hardy & Bacon LLP

(57) ABSTRACT

An apparatus and method for reading embedded indicia. A light energy sensing system for an embedded indicia interpretation apparatus. The system includes a first light sensor and a second light sensor. The first and said second light sensors being directed to sense light energy reflected by an embedded indicia. Also, an embedded indicia reading apparatus having a light energy sensing system. The light energy sensing system having a first light sensor and a second light sensor. The first and said second light sensors positioned to sense light energy that has been reflected from an embedded indicia. The embedded indicia reading apparatus also having a computerized processing system coupled with the light sensing system. The computerized processing system including a program that determines data carried by an embedded indicia by interpreting light energy signals reflected from an embedded indicia and then sensed by the light sensing system.

12 Claims, 13 Drawing Sheets

APPARATUS AND METHOD FOR READING EMBEDDED INDICIA

CROSS REFERENCE TO RELATED APPLICATIONS AND INCORPORATION BY REFERENCE

This application claims the benefit, pursuant to 35 U.S.C. §119(e), of U.S. Provisional Application No. 60/505,358, filed Sep. 23, 2003. The entire specification of U.S. Provisional Application No. 60/505,358, filed Sep. 23, 2003, including all text and drawing figures is hereby incorporated herein by this reference.

BACKGROUND OF THE INVENTION

Many articles, documents, products and the like are currently marked with machine-readable indicia. Machine-readable indicia are used to carry a variety of information. Bar codes attached to a retail article being offered for sale, for example, are commonly used to carry pricing and related data. The subsequent storage of such data in a computer-readable database facilitates the performance of several useful applications such as inventory tracking, item tracking, customer tracking and so forth. In addition, machine reading of such data is considered to be more efficient and accurate than keyed data entry requiring a human operator to manually type the data into a database.

In many marking applications, a label containing a machine-readable indicia is attached or adhered to the item being marked. In a label-less marking application, a machine-readable indicia is associated with an item by depositing ink onto the surface of the item being marked. For several types of articles, however, such marking methods are not suitable. Some items, for example, may be too small to mark with a label, some items may not have sufficient surface area available for the addition of a label, some items may be intended for use in environments that can cause the loss or degradation of the label or deposited ink, and some items may be made of a material that is not suitable for the attachment of a label or for the absorption of ink. Further, the use of labels or inks is not suitable in situations where the label or ink may come off of the item and detrimentally contaminate a process or article with an adhesive, paper or ink.

In situations where it is not feasible to mark an item via a label or other traditional method, it is frequently possible to use a technique known as direct part marking (DPM) to form an embedded indicia directly into the item being marked. Thus, in direct part marking applications, the machine-readable indicia is formed directly into the item. For example, if the item to be marked is made of a metal or a plastic, the machine readable indicia is formed directly into the plastic or metal that constitutes the item.

The material from which the item is made, which is also the material from which the indicia is formed, is referred to herein as the "substrate." The substrate can be a metal, glass, plastic, silicon or any of a wide variety of other materials. The indicia that is formed from the substrate will be referred to herein as an "embedded indicia."

The embedded indicia can use, for example, a one or two-dimensional machine-readable coding scheme to store and communicate its data. The embedded indicia can be formed using several different methods. Substrate marking methods include, for example, the use of laser peening, laser etching, pin stamping, ink-jet printing, traditional peening, dot marking, scratching, sandblasting, machining, chemical etching, electrical arc pencil, embossing, vibration etching, welding, and cast, forge or mold engraving.

When an embedded indicia has been formed from, or into, a substrate in a DPM application, the indicia takes on a three-dimensional character. This is true even though the underlying coding scheme can be a coding scheme commonly referred to as a one or two-dimensional coding scheme. The Data Matrix code is an example of a two dimensional code used as an embedded indicia in DPM applications. The Data Matrix identification symbol is described in an AIM International Inc. technical specification entitled "International Symbology Specification—Data Matrix." A variety of other coding schemes are also used in direct part marking applications. Other coding schemes used in DPM applications include PSOCR, OCRA, OCRB, Code 39, Code 128, UPC, Interleave 2 of 5 and PosiCode to list but a few.

Non-embedded machine-readable indicia, such as indicia carried on a label or printed directly onto an item, contain definite areas of differing reflectivity that represent and communicate data. The areas of differing reflectivity are read by using an optical reader. A wide variety of optical readers exist. Some optical readers operate by scanning the indicia with a laser light and sensing the light energy reflected to the reader by the indicia. These scanning-type readers can use a one-dimensional light sensor to detect the reflected light energy. Other optical readers use other types of light sources to illuminate the indicia. Further, some optical readers use a two-dimensional charge-coupled device (CCD) to sense reflected light. Further, optical reader units are sometimes constructed as a module or component that can be included in a hand-held portable computer to give it indicia reading capability. Optical readers also often include radio-frequency communication and display capabilities. The various types of traditional optical readers are not capable, however, of reading embedded indicia.

Readers capable of reading embedded indicia have been developed. As with the more traditional style readers described above, these readers include sensors to detect light that has been reflected from an indicia being read. The embedded indicia, however, since it is formed into the substrate of an item being marked, does not necessarily include areas of differing reflectivity sufficient for optical reading. Therefore, current embedded indicia readers create areas of differing reflectivity on the embedded indicia by directing light onto the three-dimensional indicia in a manner calculated to create shadows thereon. The contrast between the shadowed and non-shadowed portions of the area containing the embedded indicia creates the differences in reflectivity that can then be detected by the light energy sensor of the reader.

In order to create readable shadows, current readers of embedded indicia illuminate the indicia in a manner calculated to create shadows and thus contrast on the embedded indicia. This is depicted in FIG. 1. A light generator 100 directs light energy 102 through a first window 103 and toward an embedded indicia 104. The light energy is reflected 106 by the embedded indicia 104. The reflected light energy 106 passes through a second window 107 in the housing and toward a light sensor 108. The light sensor 108 is located separately from the light generator 100 in the housing. Compared to the location of the light generator 100, the light sensor 108 is positioned more directly above the indicia 104. The low angle 110 of the generated light energy 102 relative to the plane of the embedded indicia 104 creates shadows on the embedded indicia and thus adds the areas of differing reflectivity that can be detected by the light sensor 108.

The significant separation required between the light generator and the light sensor creates several problems and limitations when designing an embedded indicia reader. These problems are compounded if the embedded indicia reader is to be a hand-held reader. First, for example, the housing of the reader requires two separate windows, one window permitting generated light energy to exit the reader and a second window permitting the reflected light energy entering the reader to be sensed. The need for two windows increases the complexity of the manufacturing process. In addition, both windows must be specially sealed so that environmental contamination from dust, moisture, etc, cannot enter the housing and damage internal components. Second, the need to separate the light generator from the light sensor within the housing requires that the reading system include at least two independent components that must be separately installed and coupled to the system. In a reader containing several components such as a radio transceiver, infrared transceiver and/or user removable components, etc., some of which may even interfere with each other, the need to separately and specially locate the light generator and light sensor can further increase the complexity of the design task.

Third, the "shadow" style of reading requires two distinct and unobstructed light pathways between the housing and the embedded indicia. There must be a first clear pathway from the light generator to the indicia and a second clear pathway from the indicia to the light sensor. This means that the housing and its internal components must be designed so as to not interfere with either path. Further, in a hand-held unit, the unit must be designed so that it can be held and directed toward the indicia in a manner such that the user's hand will not block either of the paths. Complexity is further increased if the hand-held reader is to be a small, light-weight, portable unit that in some instances might be desired to be roughly equivalent to or smaller than the size of the hand holding it.

Consequently, a new style of embedded indicia reader is needed that avoids some or all of the limitations and requirements of the shadow-style reading system described above. For example, it is desired to develop an embedded indicia reader that can use a single port for both the outgoing transmission of light energy and for the incoming reception of the reflected signals. It is desired to develop an embedded indicia reading system that can send and receive light energy via generally the same pathway between the reader and the indicia. By way of further example, it is additionally or alternatively desired to create an embedded indicia reading component that can be added to an embedded indicia reader as a single integrated component capable of both generating the light energy and sensing its reflection from the indicia. Additionally, it is believed that a review of this specification, including its claims and drawings, will reveal and imply additional deficiencies of the prior systems that are improved or remedied by the inventions disclosed herein.

DETAILED DESCRIPTION

Figure 1:
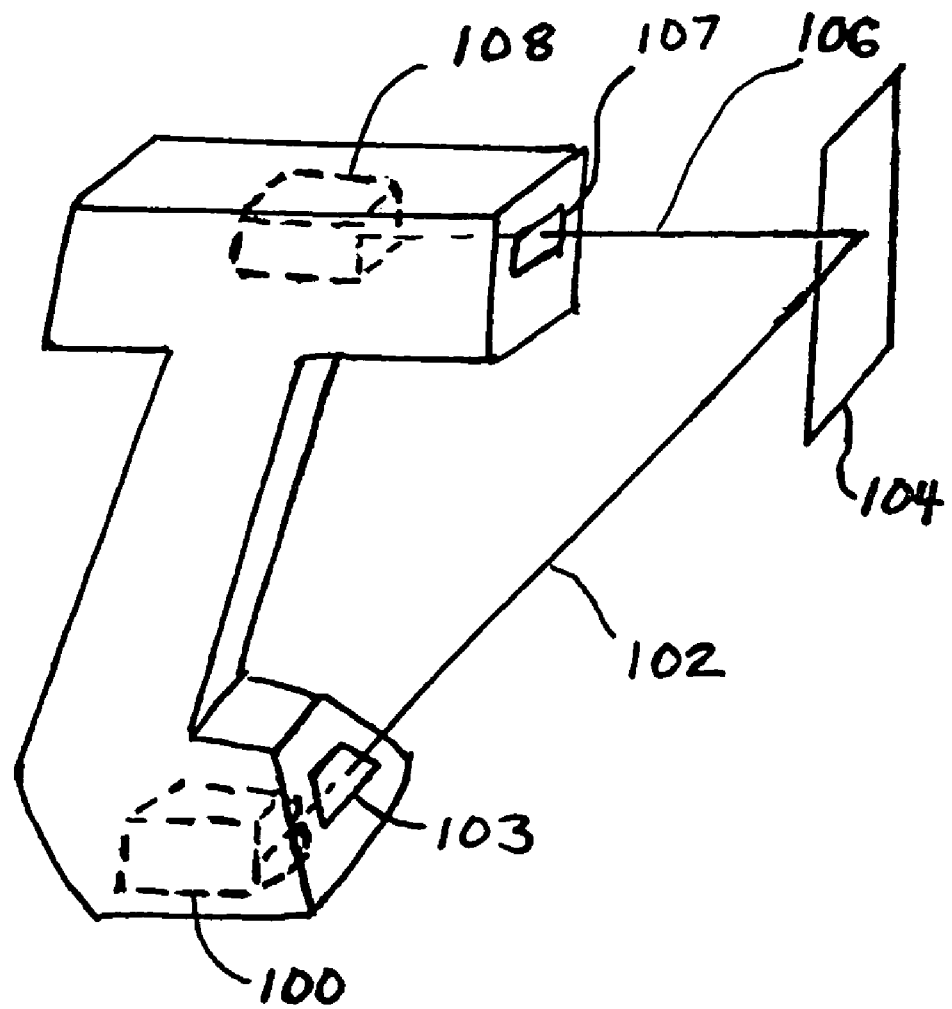
FIG. 1 depicts a current, shadow-style embedded indicia reader that illuminates the indicia in a manner calculated to create shadows and thus contrast on the embedded indicia.
Figure 2:
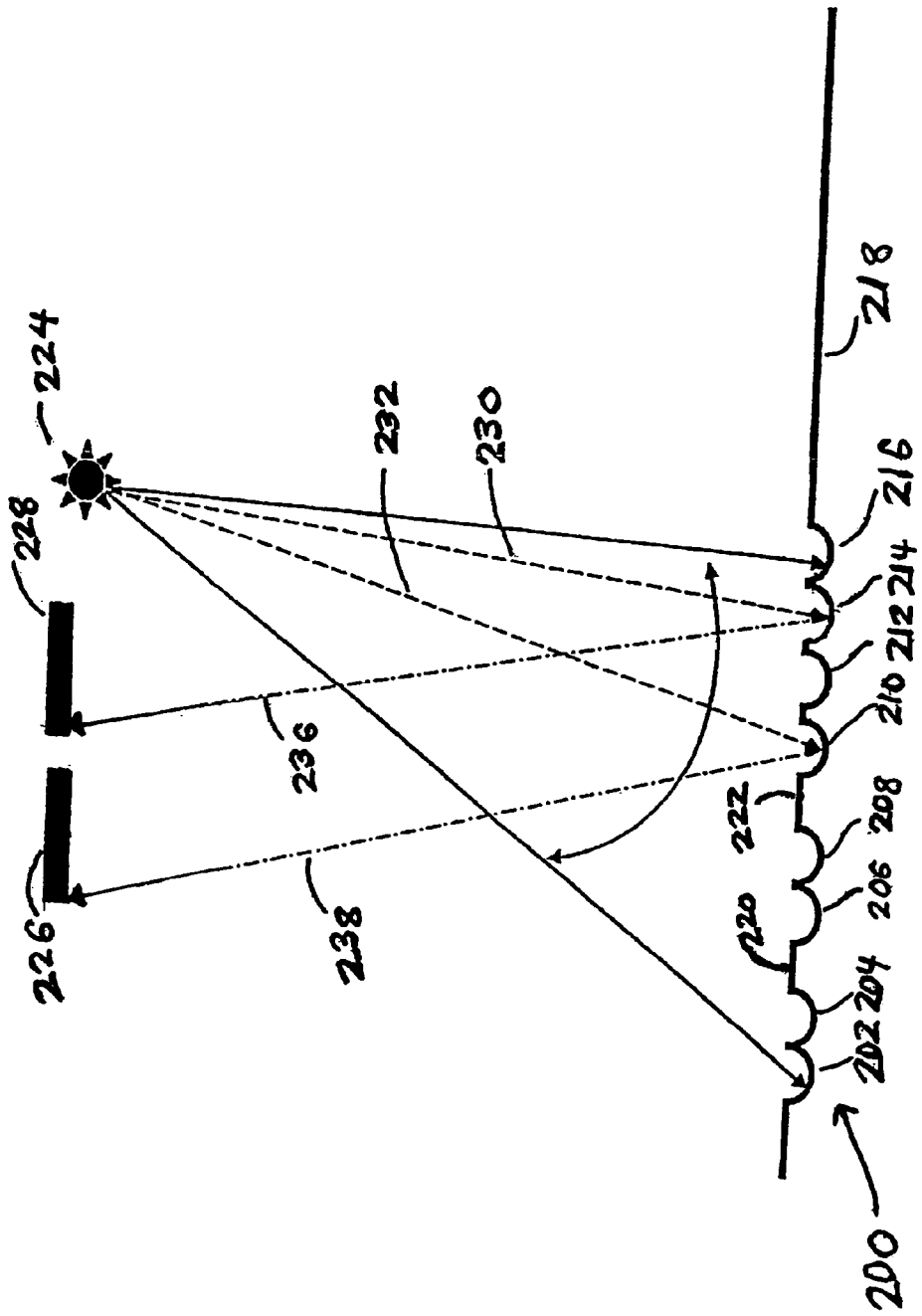
FIG. 2 depicts an embedded indicia reading system having two light sensors.

FIG. 2 depicts a reading system reading an embedded indicia 200. The embedded indicia 200 depicted in FIG. 2 includes a series of pits 202, 204, 206, 208, 210, 212, 214, 216 that have been formed into a substrate 218. The embedded indicia 200 can have any of a wide variety of physical characteristics and can employ any of a wide variety of coding schemes. The boundaries of a single embedded indicia contain a plurality of bits of information (see FIG. 3 below). Each bit of information will be referred to herein as a data element. Each data element of an embedded indicia is represented by either a substrate deformation or alteration 202, 204, 206, 208, 210, 212, 214, 216 (such as, for example, a pit, indentation, bump, etc.) or by the absence of such a deformation or alteration 220, 222.

The physical characteristics of an embedded indicia include characteristics such as the number, arrangement, depth, width, height and shape of the substrate deformations or alterations as well as the spacing between each data element. Further, the embedded indicia may organize the presentation of the data elements within a two-dimensional or a one-dimensional array structure. The array structure is related to the coding scheme used by the indicia to store and communicate its data.

Figure 3:
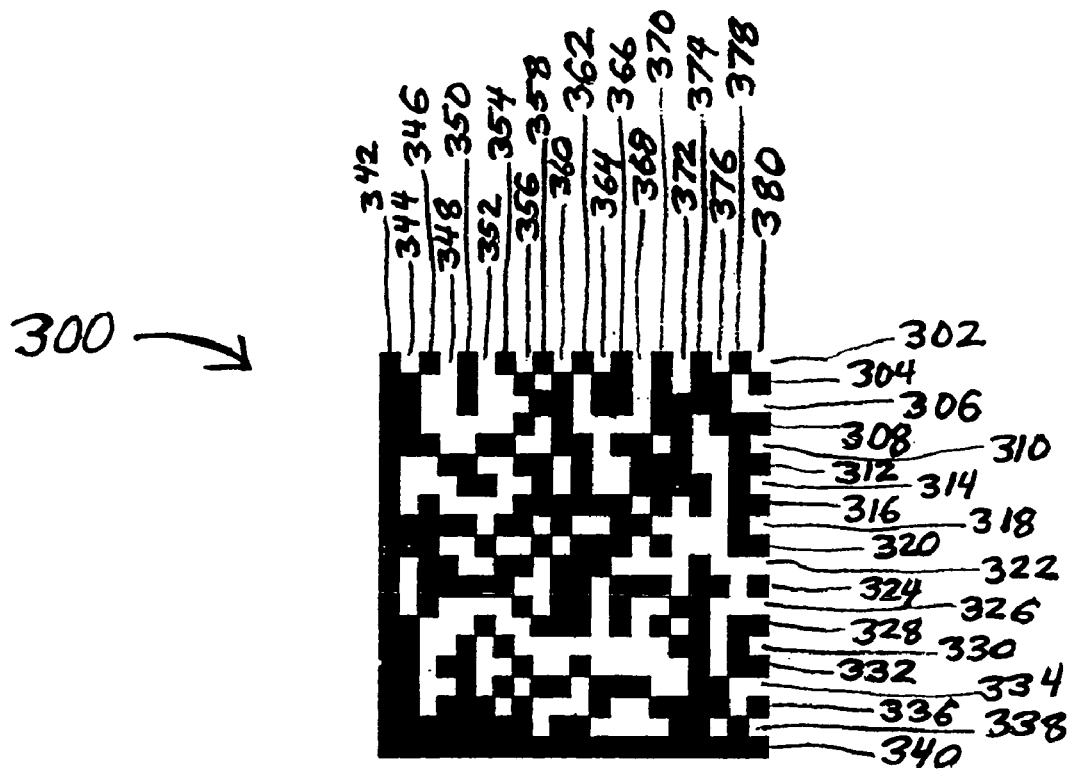
FIG. 3 depicts an example of a two-dimensional embedded indicia.

FIG. 3 depicts an example of a two-dimensional code known as Data Matrix 300. The four boundaries of this particular indicia define a two-dimensional array structure containing a plurality of data elements. In this depiction, each data element is shown as a small square region located within the boundaries of the data structure 300. This particular data structure is composed of 20 rows 302, 304, 306, 308, 310, 312, 314, 316, 318, 320, 322, 324, 326, 328, 330, 332, 334, 336, 338, 340 and 20 columns 342, 344, 346, 348, 350, 352, 354, 356, 358, 360, 362, 364, 366, 368, 370, 372, 374, 376, 378, 380 of data elements for a total of four hundred data elements. The structure uses a binary coding scheme, which is indicated in FIG. 3 by representing each data element as a white or a black square. The depiction of black and white regions in FIG. 3 is merely for explanatory purposes. The embedded indicia itself need only include altered and unaltered areas of substrate. No coloring scheme is required on the actual embedded indicia. To imprint the structure onto a substrate as an embedded indicia, one of the binary object types (for example the black squares) can be indicated by altering the substrate coincident with that portion of the embedded indicia. The other of the binary object types (for example the white squares) can be indicated by an absence of substrate alteration at that location.

The use of a Data Matrix coding scheme for the example of FIG. 3 is in no way intended to limit the scope of the present inventions. It will be appreciated that the teachings of this disclosure can be used to read a wide variety of embedded indicia employing any of a wide variety of coding schemes. Examples of several coding schemes readable by following the accompanying teachings are listed above in the Background section of this specification. Further, it is believed that the present inventions should be capable of reading all known coding schemes currently being used in DPM applications. It is further believed that the teachings of the present disclosure will also enable the reading of many of the types of embedded indicia that will be developed in the future.

Referring again to FIG. 2, the embedded indicia reading system of this embodiment includes a light source 224 and two light sensors 226, 228. As discussed in greater detail below, other embodiments can have greater numbers of light sensors. Further, it is not necessary that the light source be in the same component or even the same housing as the light sensors. Further still, the embedded indicia reading systems disclosed herein can be employed in a portable apparatus, which can be for example a hand-held or body-mounted apparatus, or in a generally fixed, stationary apparatus that is not intended to be frequently moved from location to location.

Generally, when the reading system is used in a portable manner to read embedded indicia, it will often be desirable to have the light source 224 located in the housing of the portable unit. Indeed, in many applications it will be desirable to include the light source 224 in generally the same area of the hand-held or portable unit as the light sensors so that reading can be accomplished via a single reading window or portal. Such an arrangement will also permit use of generally a single pathway for the light energy 230, 232 being directed from the light source to the embedded indicia and for the light energy 236, 238 being reflected back to the portable unit from the embedded indicia.

The embedded indicia reading systems of the present invention can also be used in a less-portable or even a stationary manner. Such a usage may be desired, for example, in connection with a warehousing or assembly line type of environment. As opposed to the portable manner of operation wherein the item containing the embedded indicia remains in a relatively fixed location and the portable unit is brought to the item to be read, in the more stationary manner of operation the reading unit remains relatively stationary and the item or items to be read are moved to the vicinity of the reading unit. The items may be transported on a conveyor belt or other type of conveying system for example.

In the less-portable or stationary manner of operation, it may be desired to position the light source remotely from the light sensors. In such situations, the light source is located in a different housing than the light sensors. For example, in one embodiment the light source may be positioned closer than the light sensors to the item to be read. In another embodiment the light source may be positioned farther from the item to be read than are the light sensors.

In operation, the reading system relies on processor execution of a program directing the reading process. As will be appreciated, the program can be stored in any of a variety of different storage media, it can be written in any of a wide variety of programming languages and it can be executed by a wide variety of processors. The processor or storage media can be located in the same housing as the light sensors or it can be located remotely from the light sensors. If located remotely, communication can be accomplished via a wide variety of communication methods, including radio frequency, optical, infrared, electrical, electromagnetic waves or any of a variety of other methods. The particular components, languages and methods chosen for a given system can be selected by one skilled in the particular art in order to meet the needs of the application at hand. Although some particular components and combinations will be specified in this description, such descriptions are not intended to limit the scope of the invention. Rather, they are offered in order to more completely and clearly explain the inventions and to give further information to one skilled in the art regarding additional embodiments of the inventions.

Figure 4:
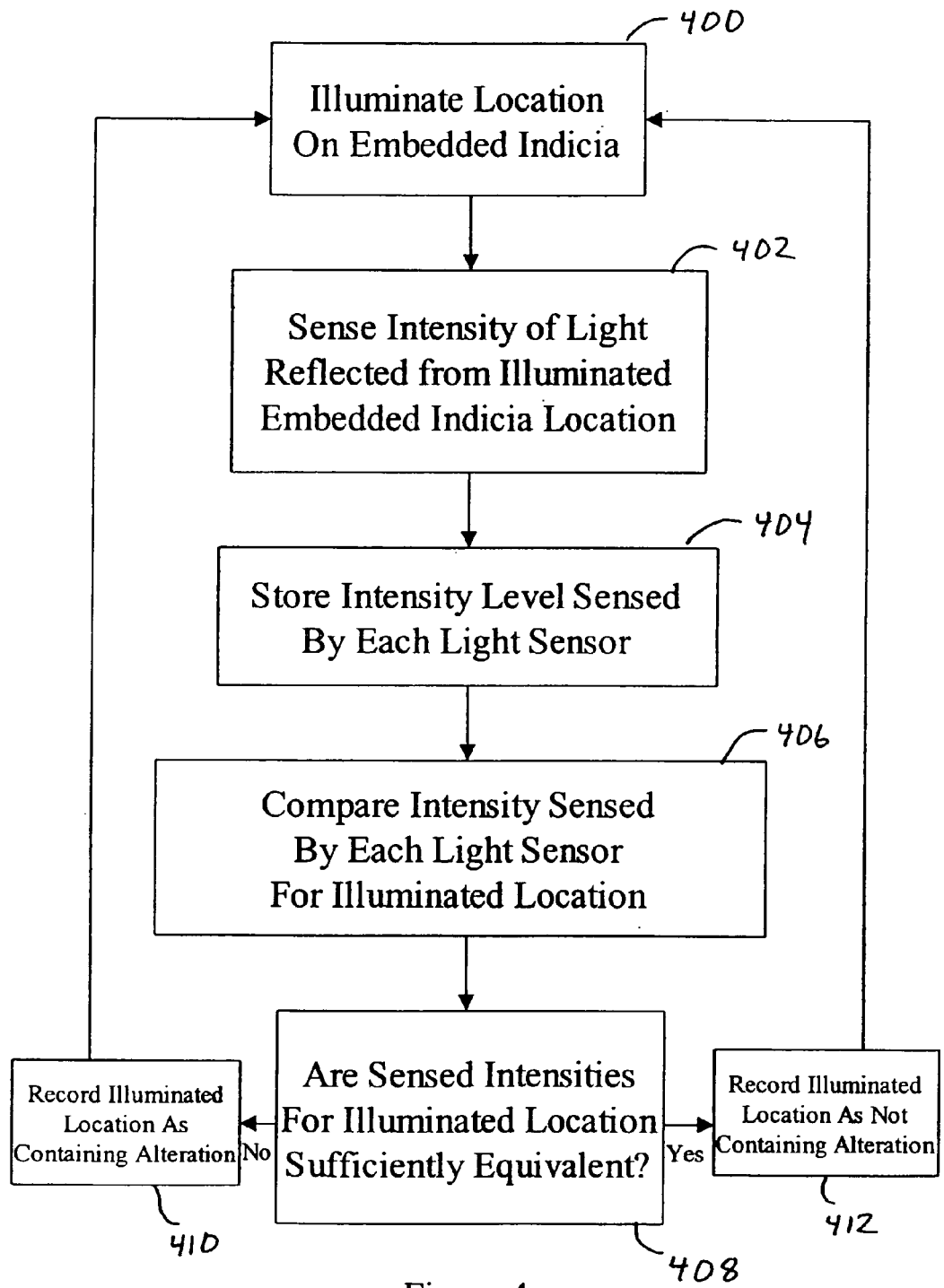
FIG. 4 is a flowchart depicting steps for reading embedded indicia with a system having at least two light sensors.

FIG. 4 is a flowchart depicting a method of reading embedded indicia according to the teachings of the present inventions. In this method, a portion of an embedded indicia is illuminated 400. The illumination is performed in a manner such that the relative location of the area being illuminated can be tracked and identified. An illumination method wherein the relative locations of illumination can be tracked will be referred to herein as a "closed-loop" illumination method.

The intensity of the light energy reflected by the illuminated portion of the embedded indicia is sensed by at least two light energy sensing devices 402. As noted elsewhere in this specification, more than two light sensors can be used. Further, the light sensors can be positioned at various locations relative to each other and relative to the light source. At various chosen time intervals, the intensity level sensed by each light sensor is sampled, quantified and its intensity value is stored 404. Each stored intensity value is correlated with data identifying the relative location with which the intensity value is associated. Thus, each light sensor is sampled simultaneously and the results are stored in a manner permitting a later comparison of those simultaneously sensed intensities.

The intensity values related to the light sensed by each light sensor for a given location are compared 406. A decision 408 is made regarding whether the various values related to the location are equivalent or sufficiently equivalent. In many applications it may be desirable to specify an intensity equivalency range. The value of the intensity equivalency range can be used to determine whether the intensity readings of the two or more light sensors are sufficiently equivalent. For a variety of reasons, different light sensors may give at least slightly different intensity readings even when exposed to the same light energy stimulus under the same conditions.

The size of the intensity equivalency range can be a predetermined value that is set by the reading system itself. It is also possible to permit an operator to set the size of the intensity equivalency range to a value suitable for the application at hand. In an additional embodiment, the system can include a default range size that can be overridden by operator command if desired. The value of an appropriate intensity equivalency range can be determined, for example, during the design process, at the time of manufacture, or during calibration of the embedded indicia reading system.

In yet another embodiment, the size of the intensity equivalency range can be under software control. Many coding schemes contain known features. For example, a particular boundary marking, targeting mark, stop or start coding, or error detection markings are often included to assist reading and decoding. When a read attempt fails, as a result of a failure to detect an anticipated component of a code for example, the software can record the failure and can respond by adjusting the intensity equivalency range value and initiating another read attempt. The adjustment can be repeated, for example, until a successful read is accomplished, until a given number of read attempts have been made, or until a given time period has expired.

For a system using a high speed rastering light source and a fast processor, multiple intensity equivalency range adjustments and read attempts can be made during a single activation of the reading system. Such a system can read a portion or segment of an indicia many times consecutively following an activation or triggering of the system. Alternatively, intensity equivalency range adjustments can be made just once per triggering or activation of the reading system. If desired, the system can keep statistics related to the success or failure rate of read attempts, code types being read, inputted data on substrate types and/or inputted data on environmental factors at the location of the reading. Intensity range settings and adjustments can then be made based on that collected information.

If it is determined that the sensed intensities are not sufficiently equivalent 410, then it is concluded that the portion of the substrate being illuminated has been altered. Referring to FIG. 2, when a portion of the second data element 214 from the right is illuminated 230 at the location depicted, the rightmost light sensor 228 will sense a sufficiently greater intensity than the leftmost light sensor 226. When a portion of the fourth data element 210 from the right is illuminated 232 at the location depicted, the leftmost light sensor 226 will sense a sufficiently greater intensity than the rightmost light sensor 228. In both cases, it will be concluded that the substrate has been altered at the location of the illumination.

If it is determined that the sensed intensities are sufficiently equivalent 412, then it is concluded that the substrate being illuminated has not been altered. Referring again to FIG. 2, when the indicated portion of the fifth data element 222 from the right is illuminated 234, both light sensors 226, 228 will sense a sufficiently equivalent light intensity. Consequently, it will be concluded that the substrate at this location 222 has not been altered. Referring now to FIG. 3, for example, if the black areas of FIG. 3 represent data elements where the substrate has been altered and the white areas represent data elements where the substrate has not been altered, then it can be seen that the ten data elements starting with the third data element from the right (column 376) in the third row 306 and extending toward the left in the third row 306 (through column 358) correspond to the ten data elements 202, 204, 206, 208, 210, 212, 214, 216, 220, 222 depicted in FIG. 2.

It should be noted that the method described in relation to FIG. 4 would cause substantially equivalent illumination to impinge on each of the multiple light sensors, and thus result in a determination of no substrate alteration, whenever a substantially flat surface is illuminated. Therefore, for example, if a bottom portion of a substrate alteration is substantially flat, each of the multiple light sensors will detect substantially equivalent light intensities and may incorrectly conclude that the substrate has not been altered at that location. It is possible, however, to avoid such incorrect conclusions by taking sufficiently close samples and by examining those samples taken prior to and after the point in question.

Data elements represented by an altered substrate 202, 204, 206, 208, 210, 212, 214, 216 have a distinctive shape as a result of the process by which they are created in the substrate. The shape of each particular type of substrate alteration will dictate a unique intensity signature (pattern of intensity changes) on the multiple light sensors as it is scanned. For example, the curved substrate alterations 202, 204, 206, 208, 210, 212, 214, 216 of FIG. 2, when read with a system having two light sensors, would cause one of the light sensors to detect a greater light intensity when downward sloping portion of the data element is illuminated. When the center of such a data element is illuminated both light sensors would detect a substantially equivalent intensity level. When the upward sloping portion is illuminated, the other light sensor would detect the greater light intensity level. Other types of substrate altered data elements would have their own distinct pattern or signature.

When such a pattern is detected, it is concluded that a substrate alteration has been encountered. Thus, even a substrate alteration having a flat portion can be detected and successfully identified. Further, if it known that substrate alterations having significant flat portions will not be encountered, the reading method can be simplified. In the simplified style of operation, substrate alterations are identified whenever a series of samples are encountered wherein substantially equivalent light intensities are not simultaneously detected by the multiple light sensors.

Figure 5:
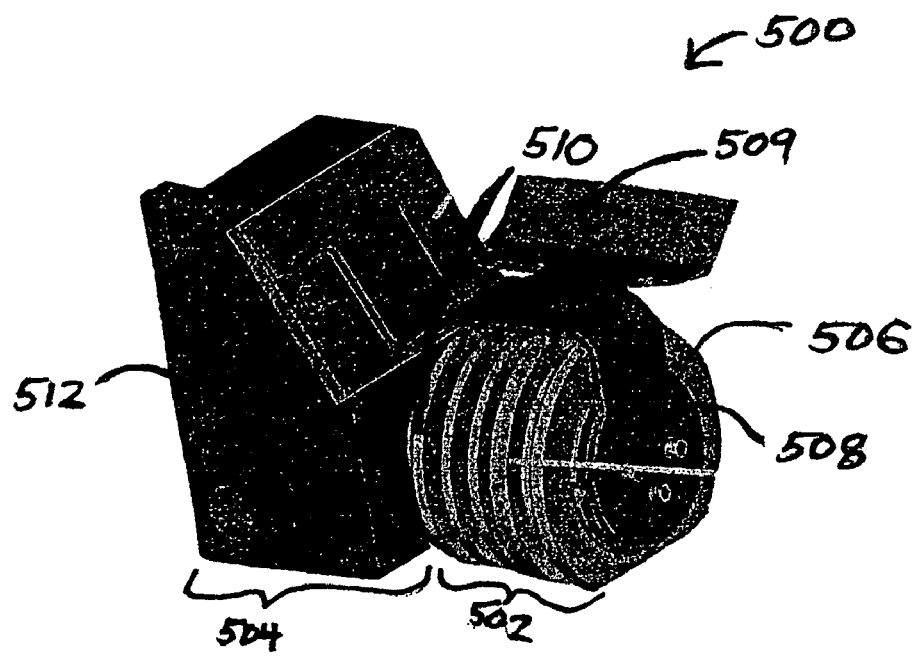
FIG. 5 depicts a back view of a laser light source.
Figure 6:
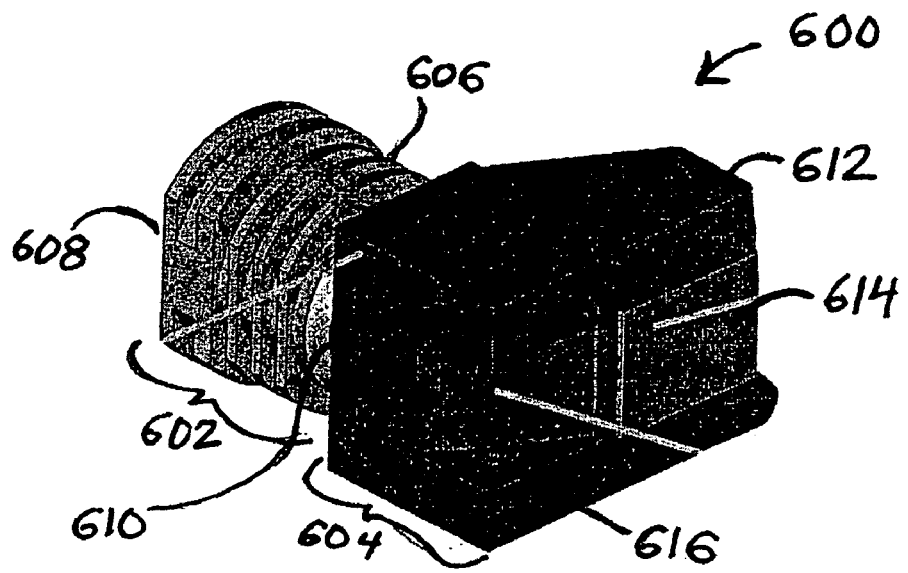
FIG. 6 depicts a front view of a laser light source.

FIGS. 5 and 6 depict respectively a back view and a front view of a laser light source 500, 600 suitable for use as a light source for the present inventions. This embodiment includes a laser light generator assembly 502, 602 and an associated laser light deflection assembly 504, 604. The laser light deflection assembly 504, 604 is depicted here as being directly connected or integrated with the laser light generator assembly 502, 602. An integrated component is not required, however, and the two assemblies (502, 602 and 504, 604) can be separate structures if desired.

The laser light generator assembly 502, 602 includes a collimator 506, 606, a laser diode 508, 608, and a lens (which can be a Selfoc lens for example). Also depicted is a flex connector 509 that is used to connect the assembly with the main controller (see FIG. 9). The lens portion of the assembly is not visible in FIG. 5 or 6 since in this embodiment it protrudes from an end 510, 610 of the collimator 506, 606 and extends into the laser light deflector assembly 504, 604. When activated, the laser light generator assembly 502, 602 generates a laser light beam. Laser diodes capable of creating light of any of a wide variety of wavelengths, visible or not visible to the human eye, are available for use in such an assembly. A particular example is a laser diode generating visible laser light with a wavelength of 650 nanometers.

Figure 8:
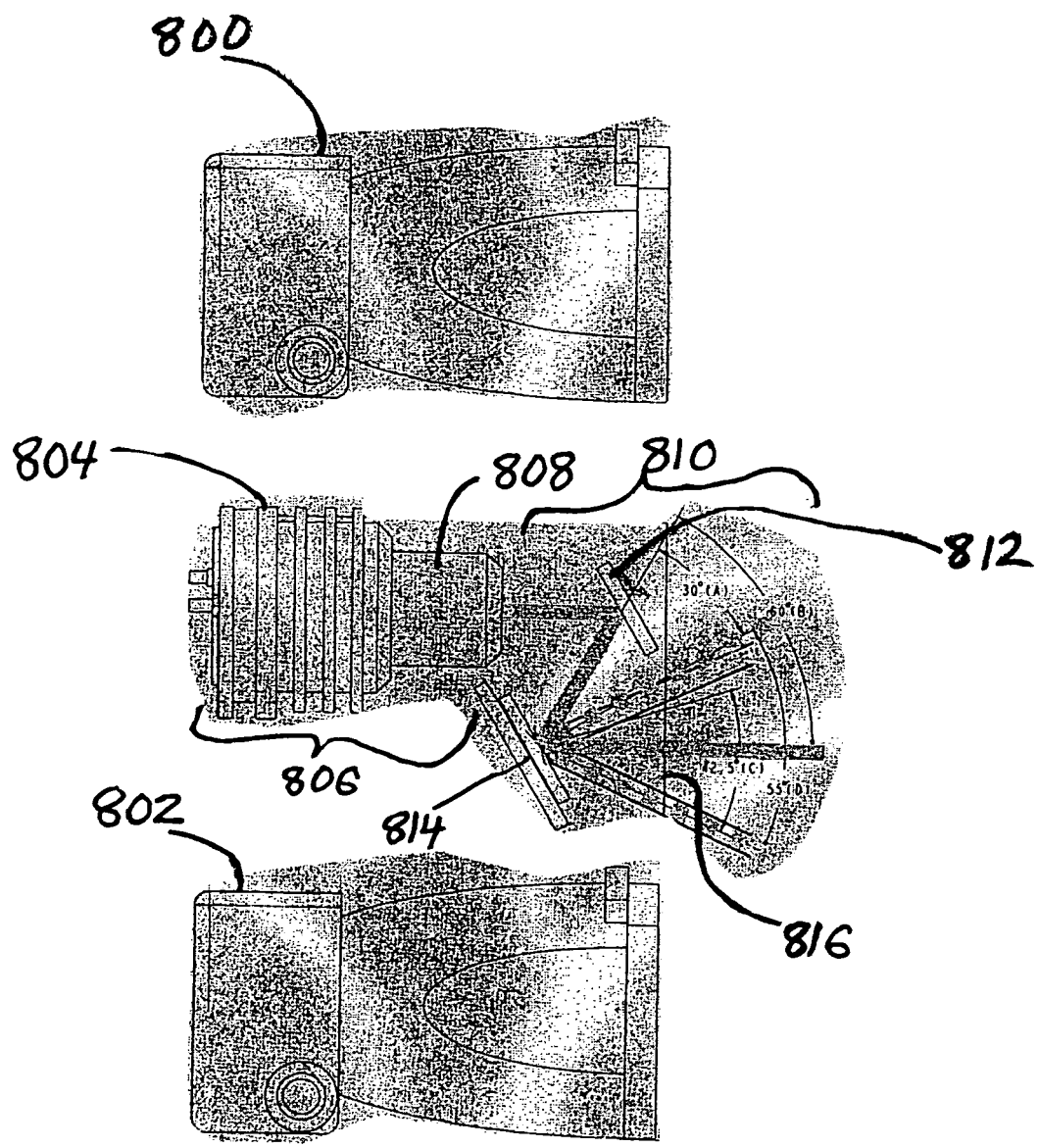
FIG. 8 depicts a top view of an embodiment of an embedded indicia reading system having two light sensors and a light source located between the light sensors.

The light laser deflector assembly 504, 604 includes a housing 512, 612, an exit aperture 614 and a mirror deflection system (only the back of a fixed mirror 616 being visible in FIG. 6). The mirror deflection system directs the generated laser light through the exit aperture 614 and out toward the indicia. One possible arrangement for the mirror deflection system is depicted in FIG. 8 below. The mirror deflection system can include a rastering component which raster scans the generated laser light over the embedded indicia to be read. A rastering component suitable for use with the present inventions is disclosed in the descriptions presented below in connection with FIGS. 13 and 14. It will be appreciated that a variety of other rastering and deflection systems can alternatively be used in conjunction with the present inventions.

As noted, the laser light deflection assembly should be a closed-loop system such that the direction, and thus the relative location of illumination, of the rastered laser light beam can be determined. This permits the system to know where each sample is being taken during the raster scanning process. The system described in relation to FIGS. 13 and 14 accomplishes this objective by precise control of a deflecting mirror. However, other systems can also be used. For example, a system that precisely sensed, rather than controlled, the position of a deflecting mirror could be used.

Figure 7:
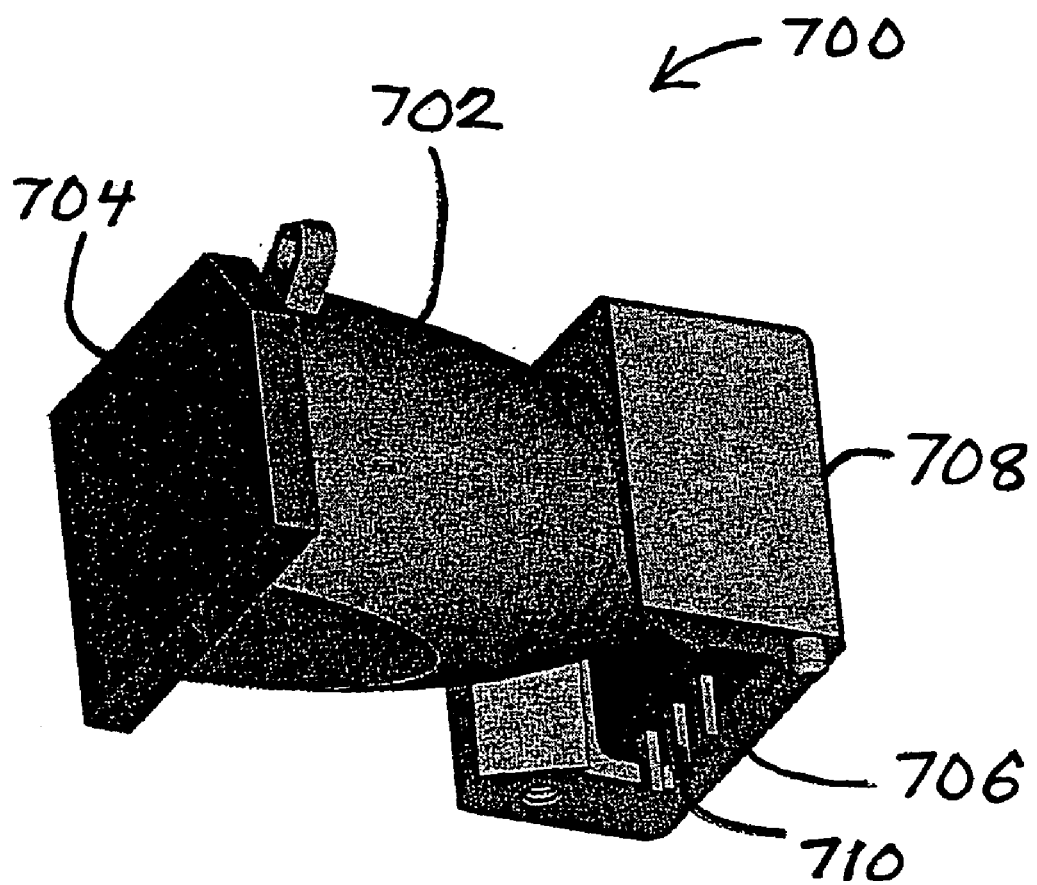
FIG. 7 depicts a perspective view of a light sensor.

FIG. 7 depicts a perspective view of a light sensor 700 such as may be used with the present inventions. While FIG. 7 depicts an embodiment of a suitable light sensor, it will be appreciated that other types or styles of light sensor assemblies can also be used with the present inventions. The light sensor depicted in FIG. 7 includes a lens 702, a filter 704, a photodiode 706 and a shield 708. The photodiode 706 can be, for example, a one-dimensional array photosensor. The photodiode 706 is surrounded on three sides by the shield 708 to limit interference from ambient light, for example. Although the lens 702 helps collect the light and channel it to the photodiode 706, it is an optional and not a required component of the light sensor. In some applications, for example, the lens 702 can be omitted. Further, when a lens 702 is included, it can be tailored to meet the needs of the application at hand. A larger or more efficient lens 702 can be used for applications where it is anticipated that greater amount of light energy will need to be collected and directed to the photodiode. In other applications, when it is anticipated that a greater amount of light energy will be available, a smaller lens 702 can be included. When light energy is sensed by the photodiode 706, an electrical signal related to the intensity of the received light energy is generated and is conductively transmitted to a control component via leads 710 protruding from the photodiode 706.

FIG. 8 depicts a top view of an embodiment of an embedded indicia reading system having two light sensors 800, 802 and a light source 804. The light sensors 800, 802 can each be a light sensor such as that disclosed in relation to FIG. 7 or any other appropriate light sensing component. The light source 804 can be the laser light source of FIGS. 5 and 6, for example, or any other suitable light source.

FIG. 8 shows the light source 804 located between the two depicted light sensors 800, 802. Other arrangements are also possible, acceptable and functional however. The light source 804 can be located on the other side of the topmost depicted light sensor 800 instead of between the two light sensors 800, 802. Alternatively, the light source 804 can be located below the bottommost depicted light sensor 802. In either of these latter two embodiments, the two light sensors 800, 802 will be located next to each other and the light source 804 will be located to one side or the other of the pair of sensors.

Further, the components need not be evenly spaced from each other. For example, in the embodiment depicted in FIG. 8, the distance between the topmost light sensor 800 and the light source 804 need not be equivalent or even substantially equivalent to the distance separating the light source 804 and the lower light sensor 802. Likewise, in the other arrangements of the components of FIG. 8, the components need not be equally or even substantially equally spaced. The spacing of the components can be chosen to meet the needs of the application at hand. By way of further example, the spacings and arrangement can be chosen so that the reading system will fit within the space constraints of the housing in which it will be placed.

As also disclosed elsewhere herein, the number of light sensors can exceed the two depicted in FIG. 8. In such embodiments, the light source can be placed between any two of the light sensors or it can be placed on one side or the other of all the light sensors. Also, if desired in such embodiments, the spacings between the various sensing and light source components need not be equivalent.

FIG. 8 also depicts a light source 806 and its lens 808 directing a light beam into a light deflection system 810. This embodiment of the light deflection system 810 includes a fixed mirror 812 (see also 616, FIG. 6), a rastering mirror 814 and an exit aperture 816. The light beam exiting the lens 808 of the light source 806 is directed onto the rastering mirror 814 by the fixed mirror 812. The light energy then exits the apparatus via the exit aperture 816. Other light deflection systems can be designed to meet the needs of the particular application at hand. The depicted deflection system, however, provides a compact, efficient integrated solution.

Figure 13:
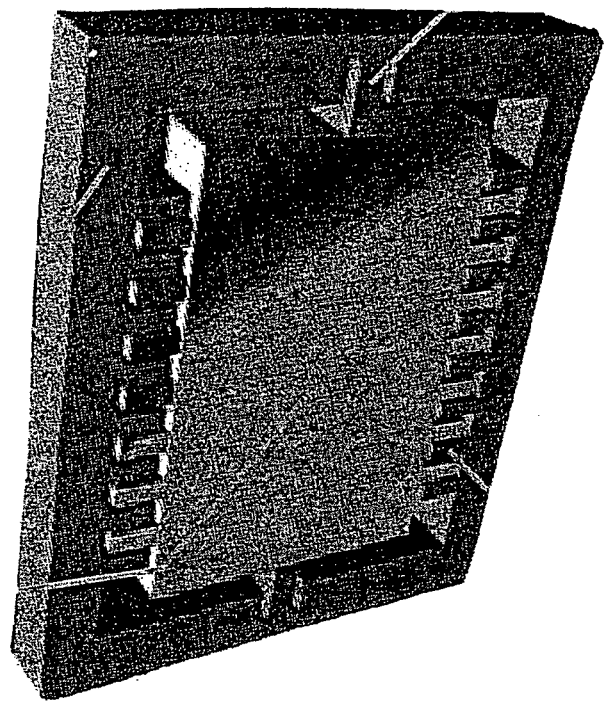
FIG. 13 depicts a front view of a mirrored rastering portion of a closed-loop rastering system suitable for use with the present inventions.
Figure 14:
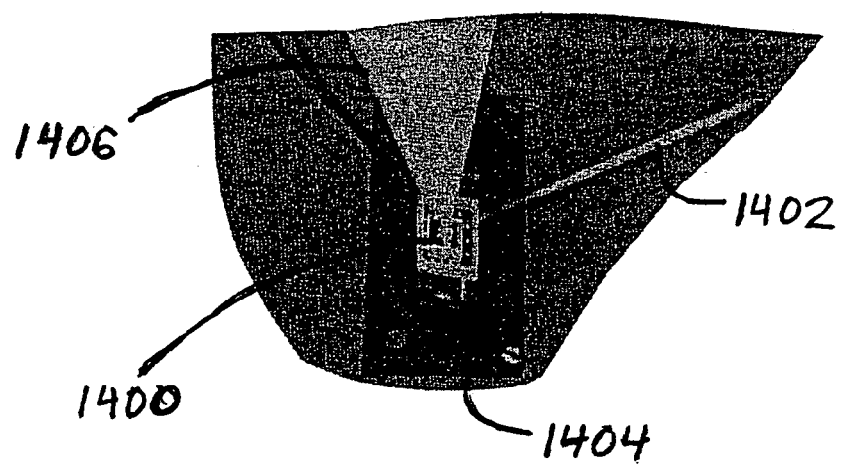
FIG. 14 depicts a rastering system being used to direct light energy toward an embedded indicia.

The rastering mirror 814 can be a micro-mirror system such as is described in relation to FIGS. 13 and 14. Other systems can be used however. The main criteria is that the rastering system be a closed-loop system. In other words, the relative position of the light beam should be trackable or determinable such that the reading system can correlate a sample taken from the light sensors to a location on an embedded indicia being read.

Figure 9:
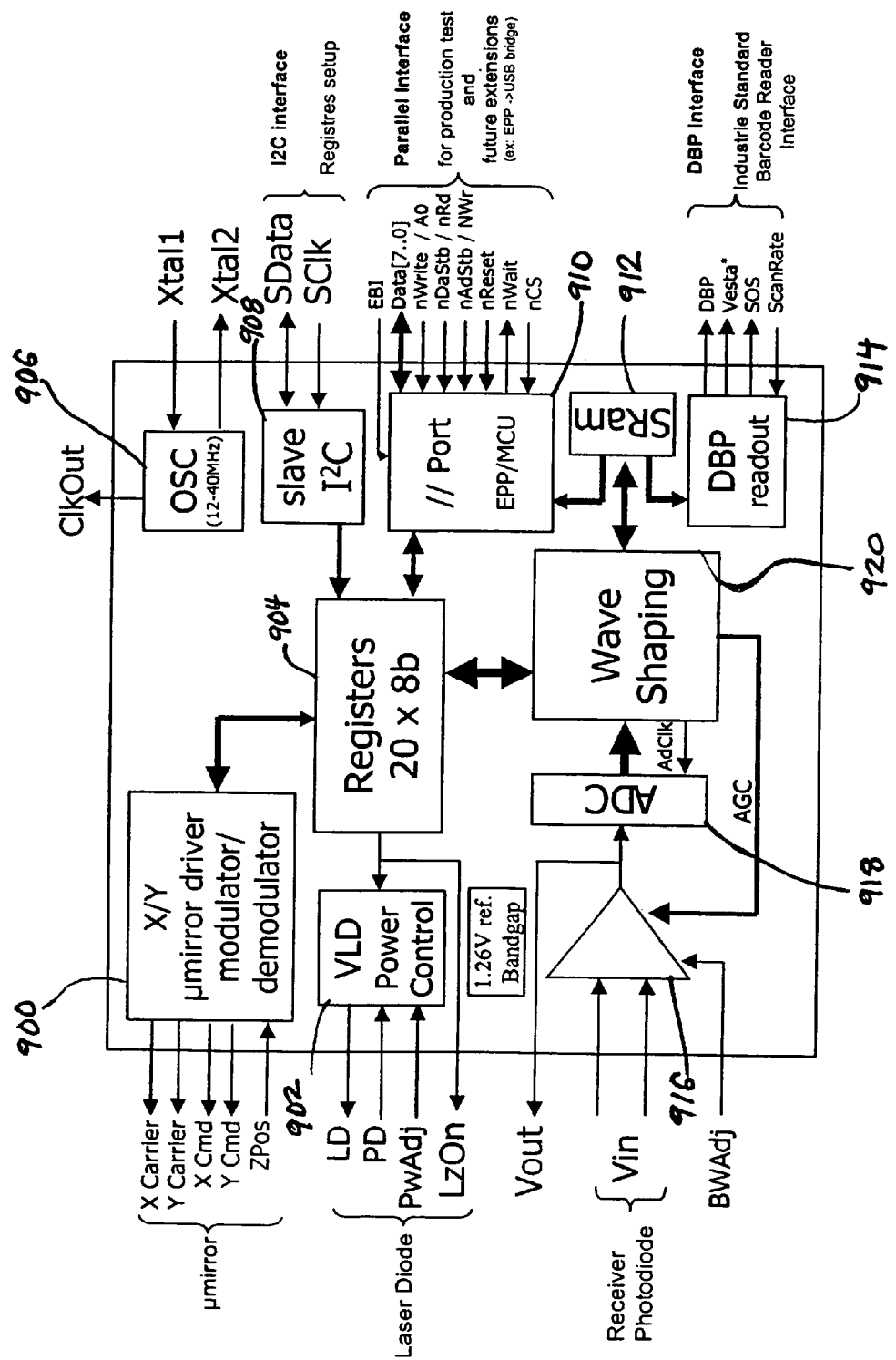
FIG. 9 is a block diagram of the subcomponents for an embedded indicia reading component.

FIG. 9 is a block diagram of the interface and control subcomponents for an embedded indicia reading component. The subcomponents can be integrated on an application specific integrated circuit (ASIC) chip if desired. The subcomponents include an X/Y mirror control modulator/demodulator 900, a visible laser diode power control 902, a register subcomponent 904, an oscillator (OSC) 906, a slave I2C interface 908, a parallel interface 910, an SRAM 912 and a bar code reader interface 914. The bar code reader interface 914 can be, for example, an industry standard reader interface such as a DBP interface. Also depicted is a photodiode interface system including an amplifier, 916, an analog-to-digital converter (ADC) 918 and a wave shaper 920. Although only one photodiode is shown in FIG. 9, it will be appreciated that the system can be expanded to include two or more photodiode receivers.

Figure 10:
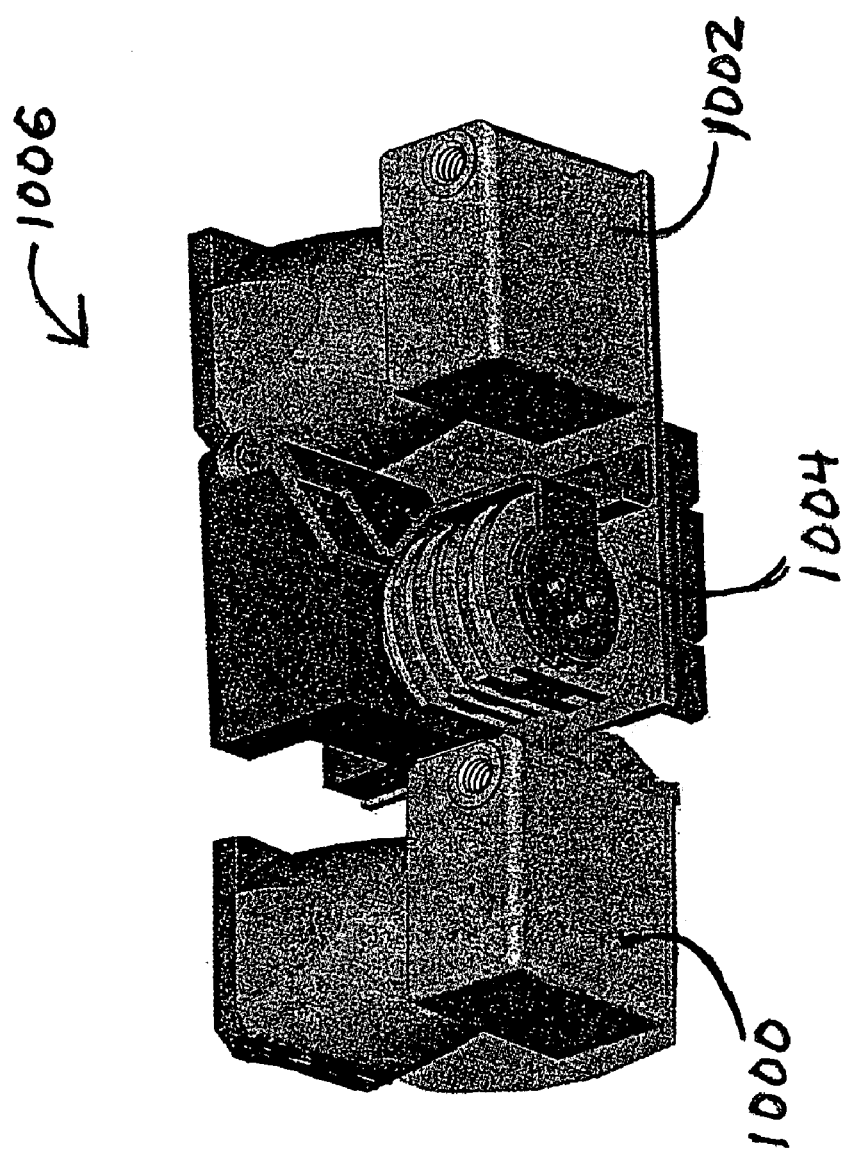
FIG. 10 depicts a back view of an embodiment of an integrated embedded indicia reading component having two light sensors and a light source.
Figure 11:
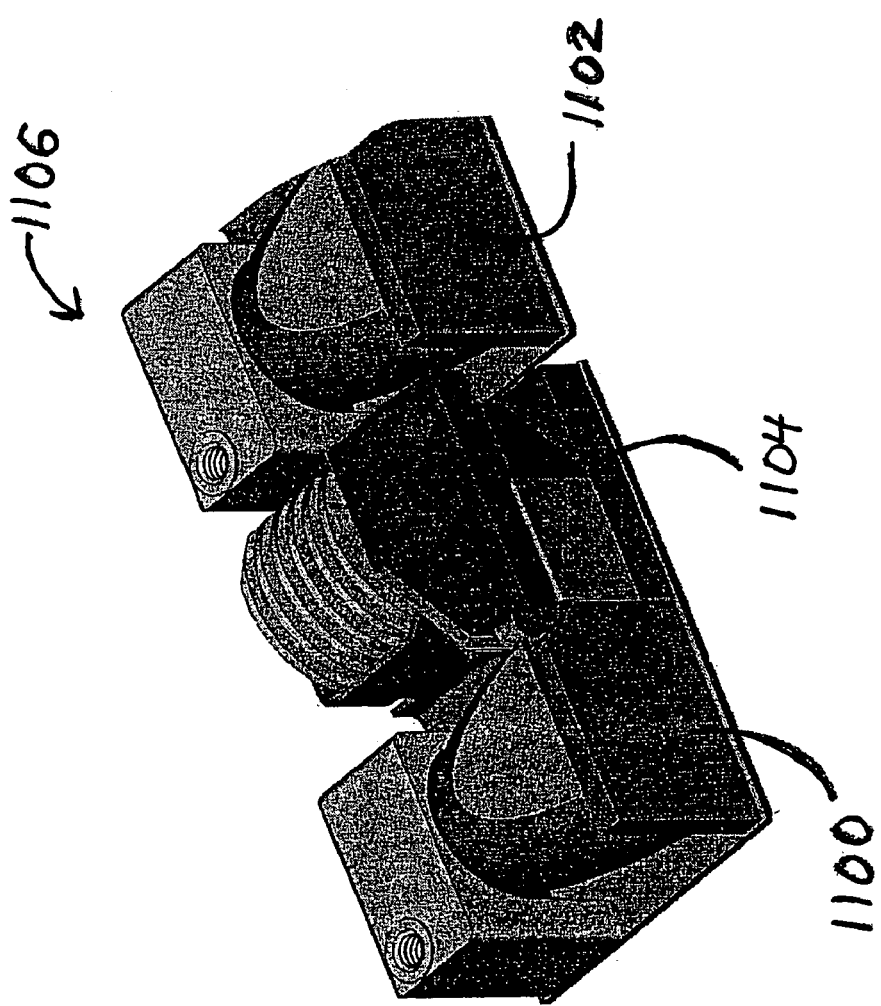
FIG. 11 depicts a front view of an embodiment of an integrated embedded indicia reading component having two light sensors and a light source.
Figure 12:
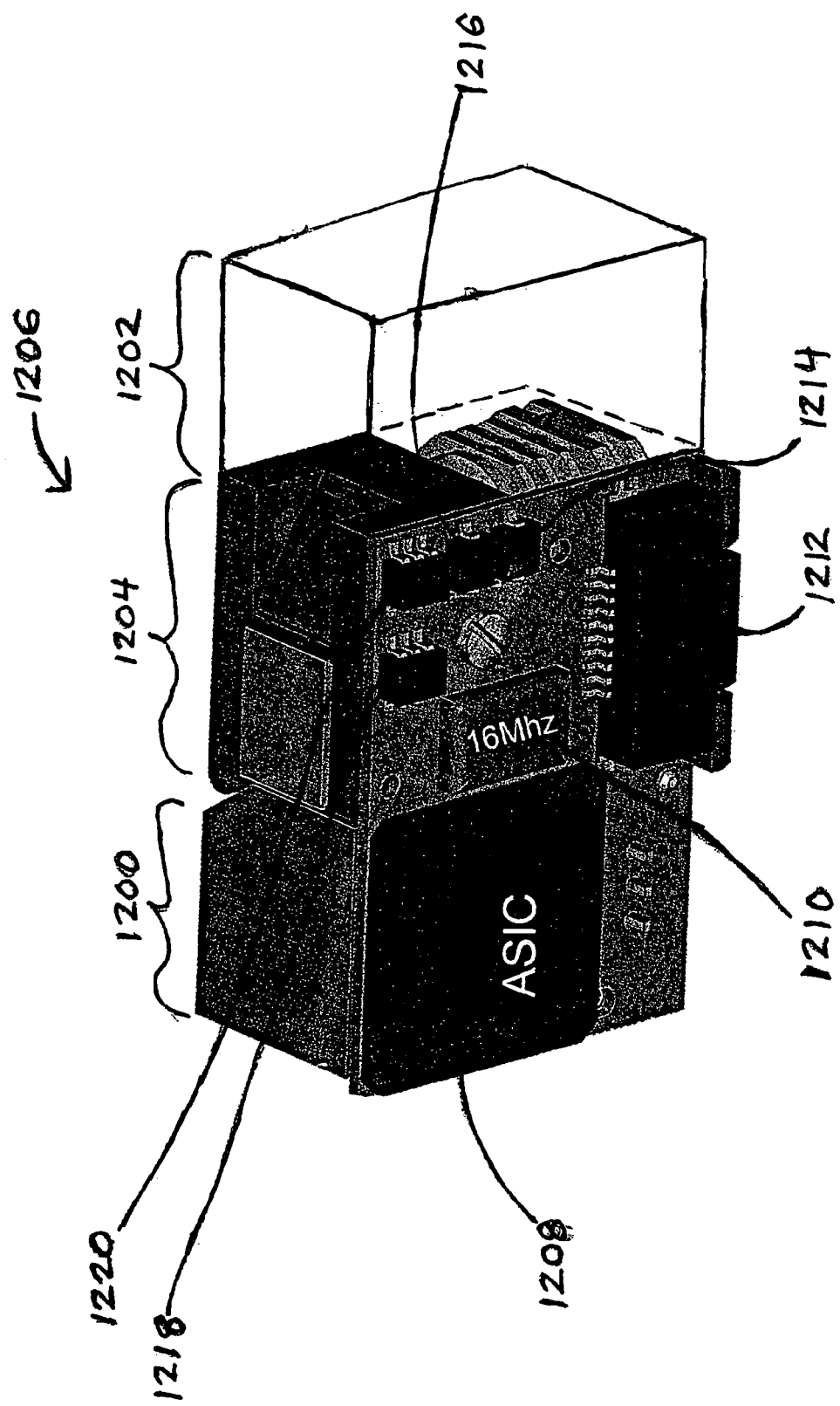
FIG. 12 depicts a bottom view of an embodiment of an integrated embedded indicia reading component having two light sensors and a light source.

FIGS. 10, 11 and 12 depict respectively a back view, a front view and a bottom view of an embodiment of an integrated embedded indicia reading component having two light sensors 1000, 1002, 1100, 1102, 1200, 1202 and a light source 1004, 1104, 1204. In this embodiment, the light source 1004, 1104, 1204 is positioned between the light sources 1000, 1002, 1100, 1102, 1200, 1202 in a single, integrated embedded indicia reading component 1006, 1106, 1206. The light sensors 1000, 1002, 1100, 1102, 1200, 1202 can be, for example, the light sensor described above in relation to FIG. 7. The light source 1004, 1104, 1204 can be, for example, the light source described in relation to FIGS. 5 and 6 above. Further, the arrangement of the components can be any of the arrangements described in relation to FIG. 8 or 15. The operation of the reading component 1006, 1106, 1206 can be as described in relation to FIGS. 2, 3 and 4.

The dimensions of an integrated component such as that depicted in FIGS. 10, 11 and 12 can be on the order of 10.6 mm in height, 14.2 mm in depth and approximately 31 mm in width. In addition, it can have a weight of 9 grams or less.

Such dimensions permit it to be integrated with a wide variety of reading units. For example, it can be placed in lightweight, portable, handheld or body-mounted units as well as larger, heavier or non-portable units.

FIG. 13 depicts a front view of the mirrored rastering portion of a closed-loop rastering system. FIG. 14 depicts the closed-loop rastering system, including the mirrored rastering portion 1400 depicted in FIG. 13, being used to direct light energy toward an embedded indicia. A laser light beam 1402 is directed toward a micro-mirror 1400 of the rastering system 1404. The mirror 1400 deflects and rasters the laser light beam 1406 over the embedded indicia to be read. The rastering component of FIGS. 13 and 14 can be used as the rastering component of any of the various embodiments disclosed throughout this specification.

The rastering system of FIGS. 13 and 14 can be a high-speed and wide scan angle raster system. It can achieve scan rates of, for example, 500 scans per second. Further, the scan angle can be adjustable and can be as wide as 50 degrees. In addition, it can achieve a resolution of 4 mils. When using a process such as the Vesta system of Intermec Technologies Corporation, a resolution on the order of 2.5 mils can be achieved. Use of a system such as that described in relation to FIGS. 13 and 14 permits an embedded indicia reader to make multiple readings and correlations during a single triggering or activation of the system.

A closed-loop rastering system suitable for use with the present inventions is disclosed in published World Intellectual Property Organization (WIPO) patent application, International Publication No. WO 02/063371 A1, published on Aug. 15, 2002, for applicants Ulric Ljungblad, Hubert Karl Lakner and Peter Durr and in International Publication No. WO 00/25170, published on May 4, 2000, for applicants Harald Schenk, Peter Durr and Heinz Kuck. The entire content of International Publication No. WO 02/063371 A1, published Aug. 15, 2002, including all drawing figures, claims, specification and any appendices is hereby incorporated herein in its entirety by this reference. In addition, the entire content of International Publication No. WO 00/25170, published May 4, 2000, including all drawing figures, claims, specification and any appendices is hereby incorporated herein in its entirety by this reference. These incorporated publications disclose a movable micromechanical component such as that depicted in FIGS. 13 and 14 that can be placed in a laser deflection assembly (504, FIG. 5; 604, FIG. 6), for example, to raster light energy across an embedded indicia.

Figure 15:
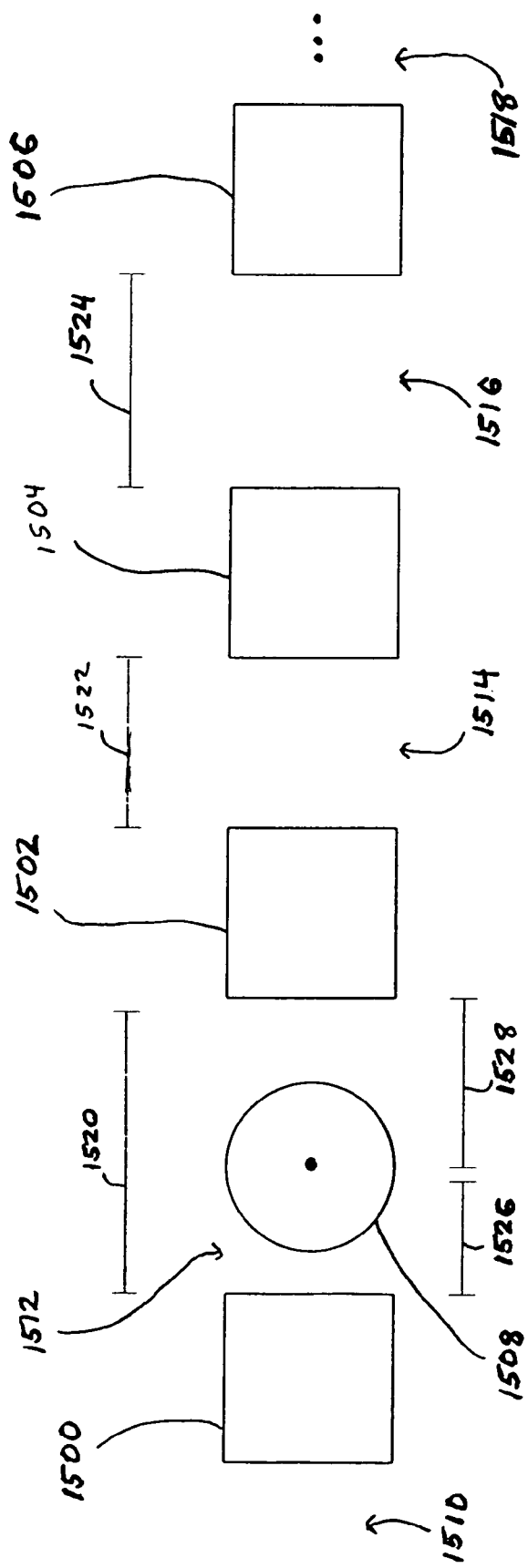
FIG. 15 depicts an embedded indicia reading system having a plurality of light sensors and illustrating various light source locations.

FIG. 15 depicts a plurality of light sensors 1500, 1502, 1504, 1506, a light source 1508 and various alternative light source locations 1510, 1512, 1514, 1516, 1518. Thus, FIG. 15 can be used to depict several different embodiments of an embedded indicia reading system. The light sensors 1500, 1502, 1504, 1506 and the light source 1508 depicted in FIG. 15 can be any of the types, or equivalents thereof, of the light sensors and light sources described throughout this specification. Further, as noted above, in some embodiments the light source 1508 is omitted from the collection of light sensors and is located at a separate location and/or in a separate housing.

For an integrated embedded indicia reading system having two light sensors (only 1500 and 1502 for example), the light sensor can be located at 1512 (as depicted) or to the left 1510 or right 1514 of the two light sensors. For an integrated embedded indicia reading system having three light sensors (only 1500, 1502 and 1504 for example), the light sensor can be located at 1512 (as depicted), to the left 1510 or the right 1516 of the three light sensors, or between 1514 the two rightmost light sensors 1502, 1504.

When a suitably fast processor is used, a reduced instruction set computer (RISC) microprocessor for example, at least four light sensors 1500, 1502, 1504, 1506 can be supported (sampled and evaluated as described in relation to FIGS. 2, 3 and 4 for example). When a light source 1508 is included it can be located at any of the locations indicated 1510, 1512, 1514, 1516, 1518. If desired, the light source can be located at a different location in a separate housing. Further, in any of the described arrangements, the distance between 1520, 1522, 1524 light sensors and the distance between 1526, 1528 light sensor and light source need not be equal. If desired, all of the components 1500, 1502, 1504, 1506, 1508 can be different distances apart.

Operationally, the multiple sensor embodiments described in relation to FIG. 15 can function in the manner described above in relation to FIGS. 2 and 4. When using three or more light sensors, other operational options exist as well. For example, when comparing the intensity sensed by the various light sensors (see step 406, FIG. 4 for example), the determination (see 410, 412, FIG. 4 for example) as to whether the illuminated location is an altered area of an embedded indicia can be made in various ways. In a three sensor system, the sensed intensities of all three sensors can be compared (see 406, FIG. 4) and if all three sensed intensities are sufficiently equivalent (see 408, FIG. 4) it can be concluded that the illuminated location does not contain a substrate alteration (see 412, FIG. 4).

In another embodiment of a three sensor system, only two of the sensed intensities are compared (406, FIG. 4). If the two selected and compared intensities are determined to be equivalent or very nearly equivalent to each other, then it is concluded that the illuminated location does not contain a substrate alteration (412, FIG. 4). If, however, the two compared intensities differ by enough to make it unclear as to whether they should be deemed to be sufficiently equivalent (408, FIG. 4), then the intensity sensed by the third light sensor can be compared to the two other sensed intensities. If the range (the difference between the highest and the lowest of the three sensed intensities) of the three intensity readings falls within a determined limit, then it can be determined that the illuminated area contains no alteration. If the range is exceeded, it can be determined that the illuminated substrate area has been altered (410, FIG. 4). Other such methods can also be used. For example, the three sensed intensities can be averaged and the difference between each sensed intensity and the average can be calculated. The three calculated differences are then summed together. If the combined differences from the average exceed a determined value, then it is concluded that the illuminated area contains a substrate alteration (410, FIG. 4). If the determined value is not exceeded, then it is concluded that the illuminated location has not been altered (412, FIG. 4). The values to be used for the range or the "combined difference" values discussed above can be determined at design time or at manufacture time. The values chosen will depend upon factors such as the type of equipment being used, the expected reading environment, the type of embedded to be read and the type of substrates expected. It will be appreciated that these teachings can be extended to systems containing four or more light sensors.

Another advantage of the present inventions is that they are able to read the more traditional (non-embedded) style of machine readable indicia, wherein areas of differing reflectivity are used to store and communicate information, as well as embedded indicia. Thus, this enables the same reading unit to be used to read a wide range of indicia including two color one-dimensional codes, such as barcodes, two color two-dimensional codes and single color embedded indicia.

When reading non-embedded codes using two or more colors, only one light sensor need be used. If desired the other light sensors can be powered down to conserve operating power. In another embodiment, however, the signals sensed by any two or more light sensors can be sampled and analyzed in order to speed read time and increase reading accuracy. Using three sensors for the reading of an non-embedded indicia would effectively triple the data gathering rate since three sets of data would be obtained during each scan of the reading light.

It will be appreciated that the inventions disclosed herein can be used in a wide variety of reading units. They can be used in stationary readers as well as in portable reading units. Further, the inventions can be used in a wide variety of portable-style readers, including handheld, vehicle-mounted, belt-mounted, helmet-mounted, etc. units. Further, they can be used in body-mounted units such as arm-mounted, leg-mounted, hip-mounted, chest-mounted, head-mounted, etc. units.

In conclusion, it will be apparent to one of ordinary skill in the art that the details presented above are beyond what is necessary to practice the present invention. As is evident from the description provided above, the implementation of the present invention varies greatly depending on the circumstances surrounding the implementation. Many variations, implementations and combinations are envisioned and disclosed. The scope of the present invention is intended to cover all variations, omissions, substitutions and combinations which are and which may become apparent from the disclosed embodiments. The scope of the invention should be extended to the claimed invention and all of its equivalents.

What is claimed is:

1. A method for determining data contained in an embedded indicia, comprising the steps of:
    directing light energy onto a data element of an embedded indicia;
    sensing light energy that has been reflected by a data element of an embedded indicia and received by a first light sensor and a second light sensor of an embedded indicia reading system; and
    comparing the light energy signals sensed by the light sensors in said sensing step to read a data element of an embedded indicia;
    wherein said comparing step further comprises the step of concluding that the relative strengths of the sensed light energy signals are within a given intensity range of each other and that therefore the light energy directed onto a data element in said directing step has been reflected by an unaltered surface of the embedded indicia.

2. The method of claim 1, further comprising the step of repeating said directing step, said sensing step and said comparing step until every data element of an embedded indicia has been read.

3. The method of claim 2, further comprising the step of decoding the read data elements to determine the information conveyed by an embedded indicia.

4. The method of claim 1, further comprising the step of calibrating the embedded indicia reading system.

5. The method of claim 1, wherein said comparing step further comprises the step of concluding that the relative strengths are not within a given intensity range of each other and that therefore the light energy directed onto a data element in said directing step has been reflected by an altered surface of the embedded indicia.

6. The method of claim 1, further comprising the step of periodically sampling the light sensors.

7. A method for determining data contained in an embedded indicia, comprising the steps of:
    directing light energy onto a data element of an embedded indicia;
    sensing light energy that has been reflected by a data element of an embedded indicia and received by a first light sensor and a second light sensor of an embedded indicia reading system; and
    comparing the light energy signals sensed by the light sensors in said sensing step to read a data element of an embedded indicia;
    wherein said comparing step further comprises the step of concluding that the relative strengths of the sensed light energy signals are not within a given intensity range of each other and that therefore the light energy directed onto a data element in said directing step has been reflected by an altered surface of the embedded indicia.

8. The method of claim 7, further comprising the step of repeating said directing step, said sensing step and said comparing step until every data element of an embedded indicia has been read.

9. The method of claim 8, further comprising the step of decoding the read data elements to determine the information conveyed by an embedded indicia.

10. The method of claim 7, further comprising the step of calibrating the embedded indicia reading system.

11. The method of claim 7, wherein said comparing step further comprises the step of concluding that the relative strengths are within a given intensity range of each other and that therefore the light energy directed onto a data element in said directing step has been reflected by an unaltered surface of the embedded indicia.

12. The method of claim 7, further comprising the step of periodically sampling the light sensors.

* * * * *